United States Patent
Vakhshoori et al.

(10) Patent No.: US 7,302,136 B2
(45) Date of Patent: Nov. 27, 2007

(54) ASSEMBLY OF OPTICAL COMPONENTS AND METHOD FOR ASSEMBLING SAME

(75) Inventors: Daryoosh Vakhshoori, Cambridge, MA (US); Masud Azimi, Belmont, MA (US); Gregory Vander Rhodes, Melrose, MA (US)

(73) Assignee: Ahura Corporation, Wilmington, MA (US)

( * ) Notice: Subject to any disclaimer, the term of this patent is extended or adjusted under 35 U.S.C. 154(b) by 728 days.

(21) Appl. No.: 10/804,641

(22) Filed: Mar. 19, 2004

(65) Prior Publication Data

US 2004/0240805 A1    Dec. 2, 2004

Related U.S. Application Data

(60) Provisional application No. 60/455,753, filed on Mar. 19, 2003.

(51) Int. Cl.
G02B 6/26    (2006.01)
G02B 6/42    (2006.01)

(52) U.S. Cl. .............................. 385/31; 385/52; 385/33

(58) Field of Classification Search ............ 385/14–15, 385/31–36, 39, 42, 47, 52, 53
See application file for complete search history.

(56) References Cited

U.S. PATENT DOCUMENTS 4,997,279 A  *  3/1991   Gordon et al. ............... 356/153
6,978,068 B2 * 12/2005   Wilson et al. ................ 385/52

* cited by examiner

*Primary Examiner*—Quyen P Leung
(74) *Attorney, Agent, or Firm*—Fish & Richardson P.C.

(57) ABSTRACT

An assembly is disclosed for optical components, the assembly comprising: a platform for receiving and supporting a plurality of carrier components having optical components mounted thereon; carrier component receiving stations formed on the platform, each of the stations being adapted to receive and retain one of the carrier components; a first one of the carrier components having a light beam outlet; and a second one of the carrier components having a light beam receiving port, wherein the optical component receiving stations are disposed to position the first one of the components and second one of the components relative to one another such that the light beam outlet and the light beam receiving port are in alignment with one another.

21 Claims, 7 Drawing Sheets

ASSEMBLY OF OPTICAL COMPONENTS AND METHOD FOR ASSEMBLING SAME

REFERENCE TO PENDING PRIOR PATENT APPLICATION

This patent application claims benefit of now abandoned prior U.S. Provisional Patent Application Ser. No. 60/455,753, filed Mar. 19, 2003 by Daryoosh Vakhshoori et al. for OPTICAL BLOCK-LIKE ASSEMBLY FOR OPTO-ELECTRONIC PLATFORMS, which patent application is hereby incorporated herein by reference.

BACKGROUND OF THE INVENTION

1. Field of the Invention

This invention relates to assemblies of optical components and is directed more particularly to a plurality of optical components selected from an inventory of optical components and positioned on a platform which receives the components and retains the components in alignment with each other to perform a desired operation on a light beam from an optical source disposed in one of the components.

The invention further relates to a method for assembling optical components.

2. Description of Prior Art

The basic nature of light, especially in the context of freespace-interconnect optical systems, requires that light generating, transmitting and modifying elements be positioned accurately relative to each other in order that an optical system made of such elements functions properly and efficiently. This is of prime importance in electro-optical, all optical, and micro-optical electromechanical systems. For example, an opto-electronic assembly may require combining of light from multiple semiconductor lasers or light emitting diodes (LED's), using lenses, beam splitters, polarizing and birefringence elements into and out of one or multiple semiconductor optical amplifiers (SOA) or power optical amplifiers (POA), and then coupling the light into one or multiple single mode fibers. Successful implementation of such a system requires micrometer to sub-micrometer alignment and attachment accuracy of the optical components.

A common practice for aligning and fixing optical components in an optical system similar to the one described immediately above is to attach some of the components, such as lasers or LED's, on a platform with reasonable accuracy and then actively align those components, by monitoring some error signal, and attach other elements, such as lenses or fibers, one after another relative to the light source, onto the platform by some means. If, during the attachment process, the relative position of each component is deviated from its optimal point, then it is necessary to go back and perform additional active alignment and correction. This technique requires that the combination of the initial alignment step and subsequent correction steps, after component attachment, guarantees micrometer to sub-micrometer positioning accuracy. This process is normally very tedious and time-consuming and is a major bottleneck in optoelectronic packaging technology. Another drawback of this technique is its incompatibility with an assembly-line-like manufacturing process, either with manual or automated equipment.

SUMMARY OF THE INVENTION

This invention presents a technique for alignment and attachment of optical components, such as lenses, fibers, semiconductor light emitters and amplifiers, beam splitters etc., with respect to each other without requiring micrometer to sub-micrometer alignment and attachment accuracy.

In addition, this technique enables one to assemble and construct any complex and multi-element optoelectronic assembly using simple building blocks, effectively raising the level of integration.

Based on this invention, one can build various simple optical building blocks, independent from each other, and then by "matching" these blocks to each other in different configurations, create different functionalities and performance using selected ones of the same generic blocks. Using this invention, complex optical systems can be readily populated, configured and manufactured on demand in a manner somewhat analogous to printed circuit boards for the electronics industry.

According to this invention, an optical system, such as the above example, is divided into several subassemblies and each subassembly is treated as an "optical black-box". Each black-box is provided with a combination of single or multiple optical and electrical elements and terminals. Black boxes or "OPTICAL-BLOCKS" are designed such that they "match" and "click" to each other through their terminals. By way of example, an optical system may consist of a platform, a laser diode, two collimating lenses, an optical isolator, a beam splitter, a photo-detector and a fiber assembly. The entire optical assembly may be divided into three subassemblies: 1) SID-BLOCK, which consists of an isolator, photo-detector, and splitter; 2) LASER-BLOCK, which consists of a laser on sub-mount and a collimating lens; and 3) FIBER-BLOCK, which consists of a fiber assembly and a collimating lens.

One can assign certain optical and electrical terminals for each OPTICAL-BLOCK assembly. For example, the SID-BLOCK has two optical terminals and one electrical terminal. The two optical terminals are incoming and exiting light in and out of the subassembly and the electrical terminal is connected to the photo-detector. Optical terminals are in fact collimated beams which are entering or exiting each BLOCK-LIKE subassembly.

Accordingly, there is provided a system for assembling optical components relative to one another, the system comprising:

a plurality of carrier components, each one of the carrier components having a base portion, a top surface and a bottom surface of the base portion in opposition to one another, the base portion defining a given geometric shape, and at least one of the optical components disposed on the top surface of the base portion;

an optical platform having an upper surface and a lower surface in opposition to one another, the upper surface of the optical platform having alignment patterns extending upwardly therefrom, and the alignment patterns defining a plurality of regions therebetween on the optical platform, wherein one of the regions is configured to secure the given geometric shape of the base portion of one of the carrier components thereto; and alignment means for aligning an optical transmission between the optical components mounted on separate ones of the carrier components.

In accordance with a further feature of the present invention, the is provided a method of assembling optical components relative to one another, the method comprising:

selecting at least two carrier components from a group of carrier components, each one of the carrier components having at least one optical component mounted thereon;

selecting a given number of regions from a plurality of the regions formed by alignment patterns on an optical platform, the given number of regions being equal in number to the at least two carrier components selected from the group of carrier components; and positioning each one of the at least two carrier components within the selected regions formed by the alignment patterns on the optical platform.

In accordance with a still further feature of the present invention, there is provided an assembly of optical components, the assembly comprising:

a platform for receiving and supporting a plurality of carrier components having optical components mounted thereon;

carrier component receiving stations formed on the platform, each of the stations being adapted to receive and retain one of the carrier components;

a first one of the carrier components having a light beam outlet; and a second one of the carrier components having a light beam receiving port;

wherein the optical component receiving stations are disposed to position the first one of the components and second one of the components relative to one another such that the light beam outlet and the light beam receiving port are in alignment with one another.

In accordance with another further feature of the present invention, there is provided a method for assembling optical components into an assembly for providing an emitted beam of light and for manipulating the beam of light to provide a desired result, the method comprising the steps of:

providing an optical component mounted to a carrier component for emitting a light beam, providing further optical components mounted to a further carrier component, the optical components adapted for manipulating the emitted beam to obtain a desired optical output;

providing a platform having stations adapted to receive the carrier components having the optical components and retain the carrier components having the optical components in position for interaction with each other so as to effect the desired optical output;

providing a repository of diverse optical components mounted to carrier components, each adapted to perform an operation on the emitting beam of light; and fixing the carrier component having the light emitting optical component and the further carrier components having the optical components selected from the repository of optical components to the platform;

whereby to form an assembly of optical components configured to manipulate the emitted beam to accomplish the desired result.

The above and other features of the invention, including various novel details of construction and combinations of parts and method steps, will now be more particularly described with reference to the accompanying drawings and pointed out in the claims. It will be understood that the particular device and method embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENTS

Figure 1:
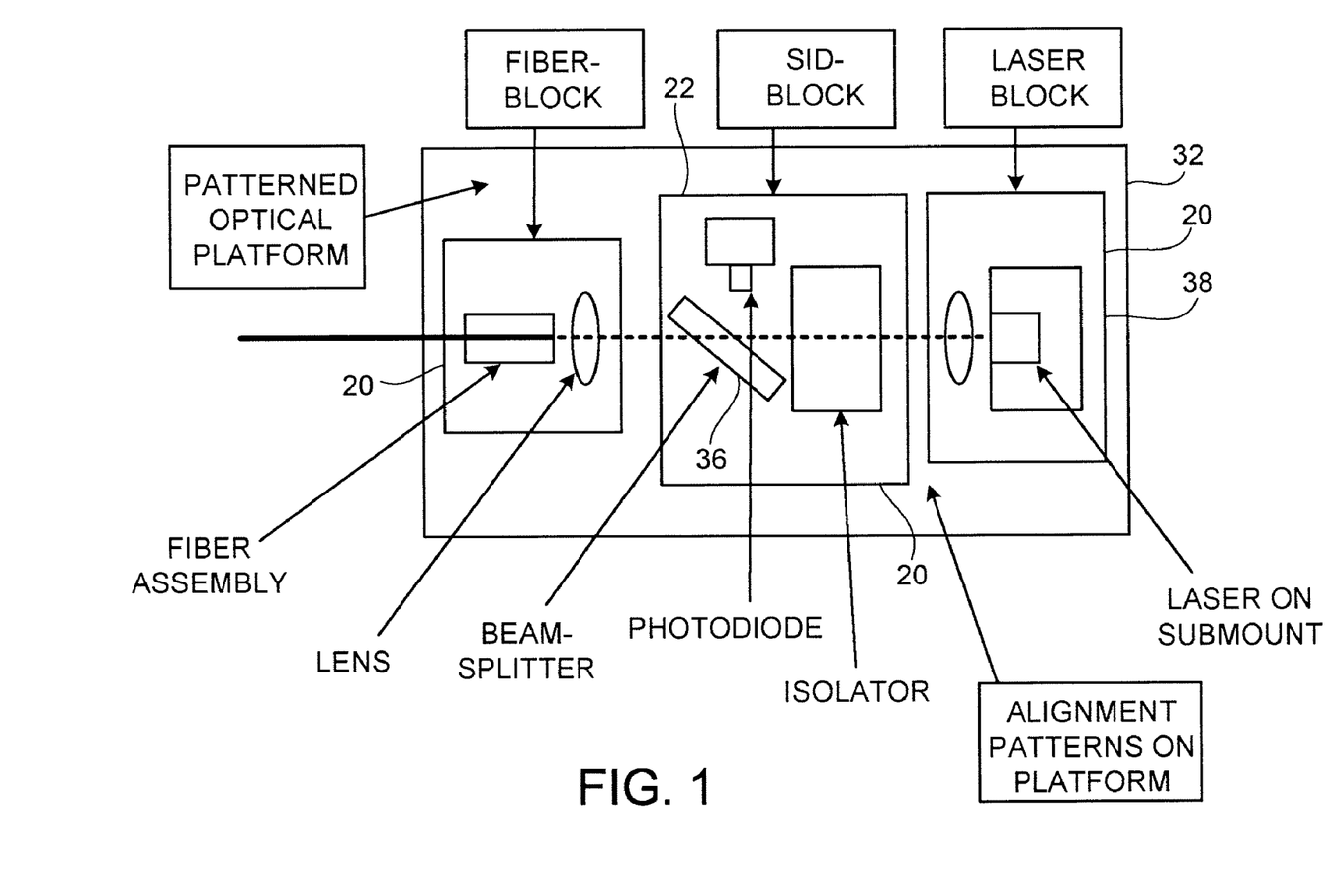
FIG. 1 is a diagrammatic plan view of one form of assembly illustrative of an embodiment of the invention.

Referring to FIG. 1, it will be seen that an illustrative assembly may consist of several elements, such as three subassemblies 20, referred to herein as BLOCK-LIKE subassemblies, or black boxes.

Figure 2:
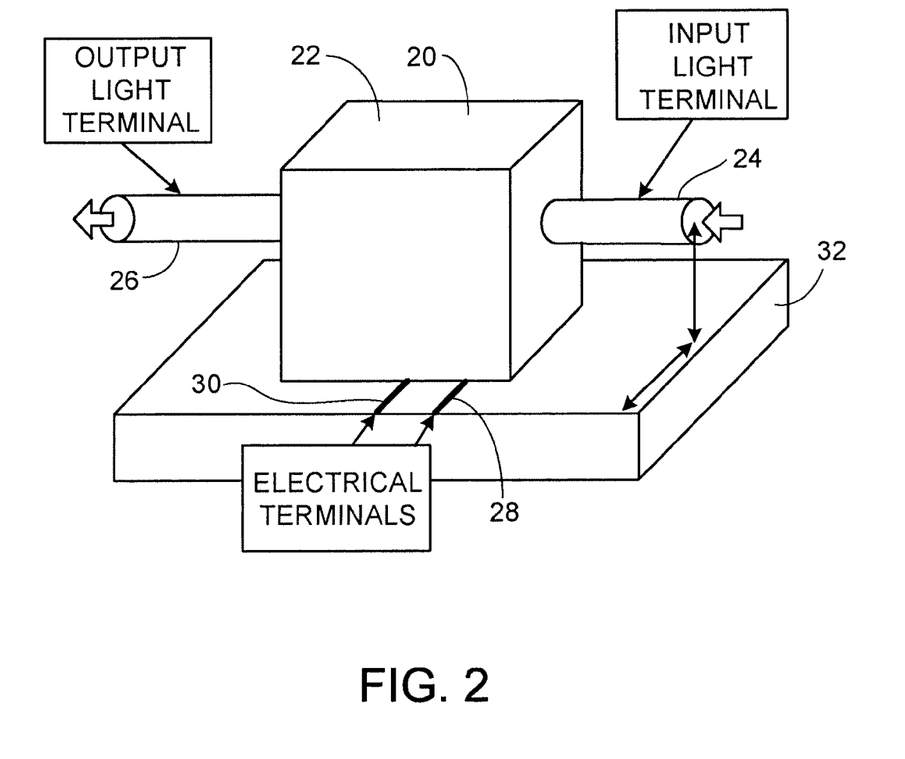
FIG. 2 is a diagrammatic perspective view of components of the assembly of FIG. 1.

In FIG. 2, there is shown a black-box 20, which may consist of a SID-BLOCK subassembly 22, having two optical terminals 24, 26 and two electrical terminals 28, 30.

Figure 3:
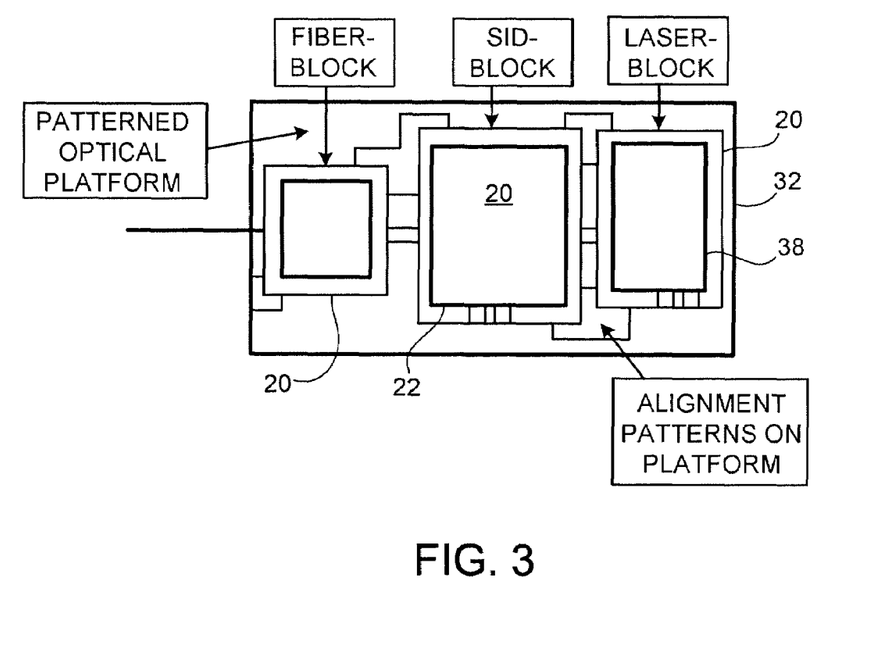
FIG. 3 is similar to FIG. 1, but illustrative of placement markings on a platform of the assembly.

To provide other subassemblies on a platform 32, one can construct structures with BLOCK-LIKE building blocks 20 which can be "clicked" into each other through their terminals. This concept is shown in FIG. 3. In order for this concept to work properly, it is important that two conditions be satisfied:

(1) a collimated beam exiting from one subassembly 20 must have the same diameter (D), (and thus the same divergence angle $\Theta$), as the collimated beam entering the next subassembly 20—a special case is when all collimated beams in free space and which are connecting subassemblies have the same D;

(2) an exiting beam from one assembly and entering beam to the next assembly must be collinear with each other—in other words, the lateral (x) and vertical (y) position of these two beams must be the same and the two beams must be parallel to each other.

If these two conditions are satisfied, one can build each block 20 separately and independently from other blocks, and then align them with each other with more relaxed placement tolerances, compared to traditional schemes of alignment. The fact that alignment and attachment accuracies will be more relaxed will be discussed hereinafter.

In FIG. 3, there is shown the optical platform 32 with three BLOCK-LIKE black boxes 20 mounted thereon. One of the major advantages of the method described herein is that it enables one to make each block 20 independently from other blocks and then attach them together by aligning optical terminals. Each subassembly should be kept as simple as possible with the simplest possible function. Furthermore, it should have a generic function which can be utilized and shared for realizing different configurations.

Figure 4:
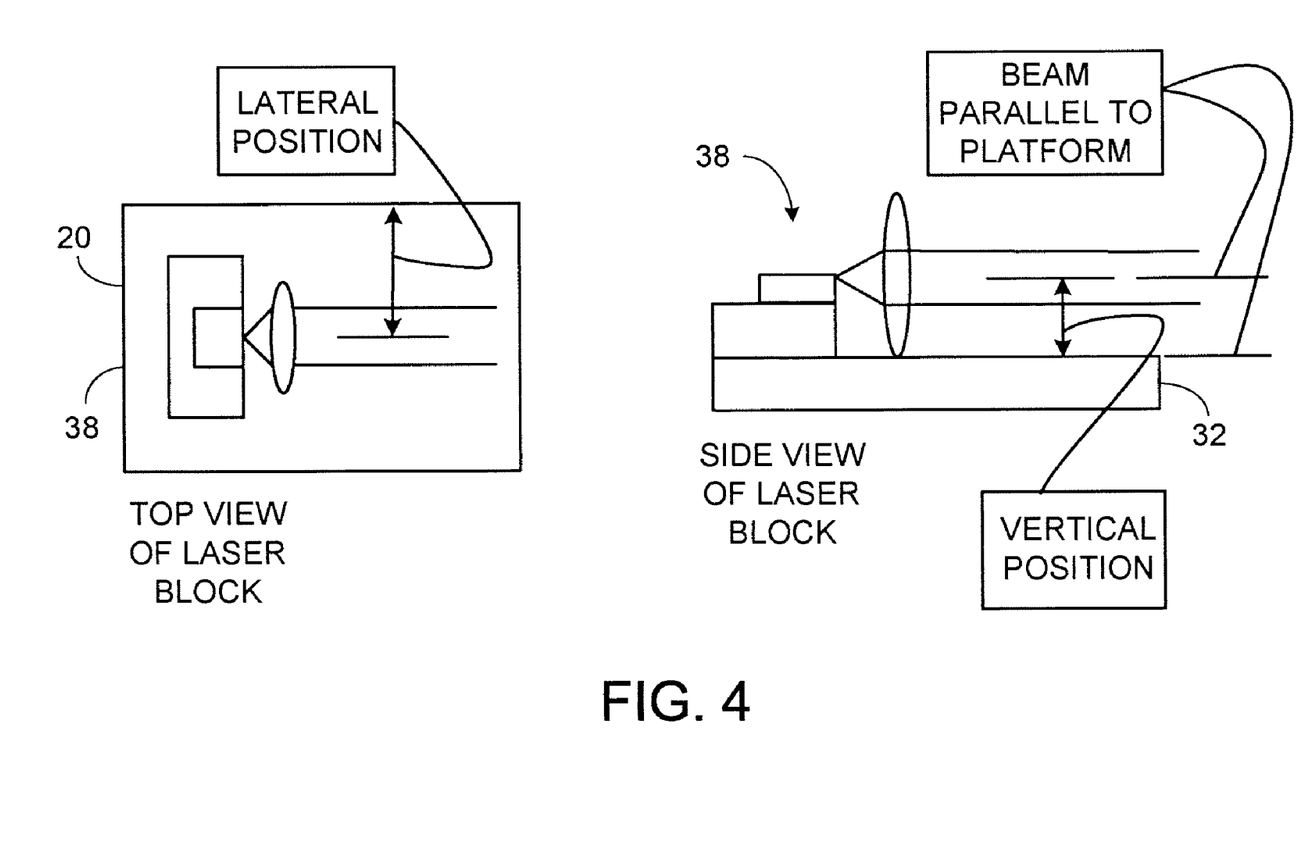
FIG. 4 presents top and side diagrammatical views of one component of the assembly of FIG. 1.

For example, in many optoelectronic assemblies, such as semiconductor laser modules or semiconductor optical amplifiers with free space coupling, it is required that the divergent light from a laser emitting spot be collimated for passing or coupling to the next element. Thus, a simple building block would be a light source with a collimating lens fixed in front of its facet which provides a collimated laser beam with certain diameter D (and divergence angle Θ). Then, the light from this block has a given lateral (X) and vertical (Y) position relative to edges of the block. A simple way to satisfy the second condition noted hereinabove in the list of criteria is to make sure all the collimating beams exiting or entering any BLOCK 20 be parallel to some reference plane, such as the base of the platform 32. FIG. 4 depicts this concept. In addition, when one "attaches" these BLOCKS onto each other, one must make sure collimated beams are parallel to each other on the plane of the common optical platform 32.

Figure 5:
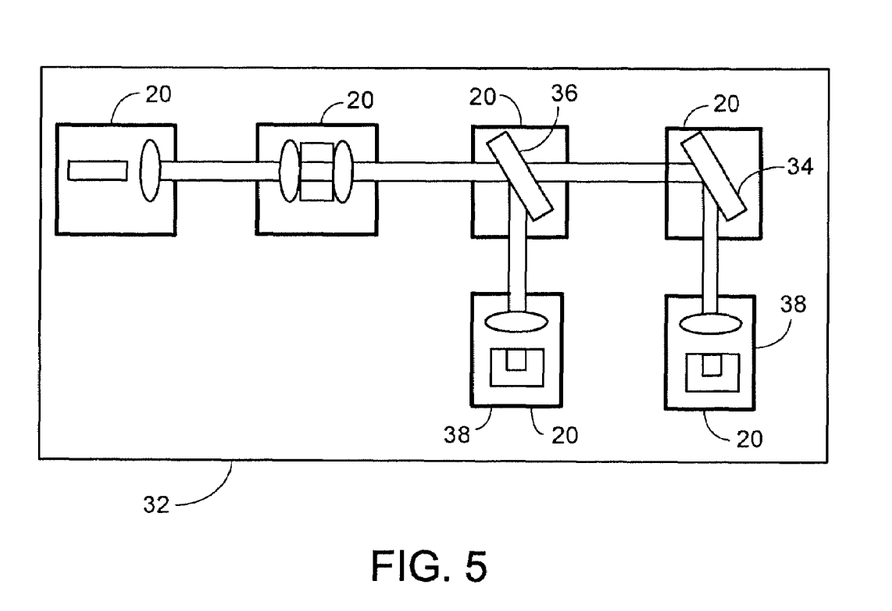
FIG. 5 is similar to FIG. 1, but includes an expanded assembly.

FIG. 5 shows how the building blocks 20 can be used to make more complex optical platforms with a few standard optical building BLOCKS. In this example, other generic building blocks, such as beam reflectors 34 and beam splitters 36, have been added. It is clear that the number of generic building blocks can be increased as the complexity of the system increases. However, once a generic building block is designed and built, it can be used for other configurations.

FIG. 4 illustrates the method to construct a laser BLOCK assembly 38 by following the above design rules.

FIG. 5 illustrates a complex optical assembly created by "matching" of optical BLOCK-LIKE subassemblies 20. The subassemblies 20 have been constructed using the two criteria mentioned hereinabove.

Manufactured optical building BLOCKS 20 will typically have errors in (X,Y) positions of the collimated beam relative to edges of the subassembly base 32. In addition, the collimated beam will typically not be exactly parallel to the base and side edges of the block as is required. These positioning errors generally arise from three sources: (1) measurement inaccuracy; (2) alignment inaccuracy of motion systems for positioning of the elements; and (3) shift or deviation of components immediately after attachment. The first two problems can easily be solved by using precise measuring and positioning systems which are already available with one order of magnitude better resolution (nanometer) than what is needed here. However, the third source of error, as long as it is within certain limits, is tolerable in this invention.

Figure 6:
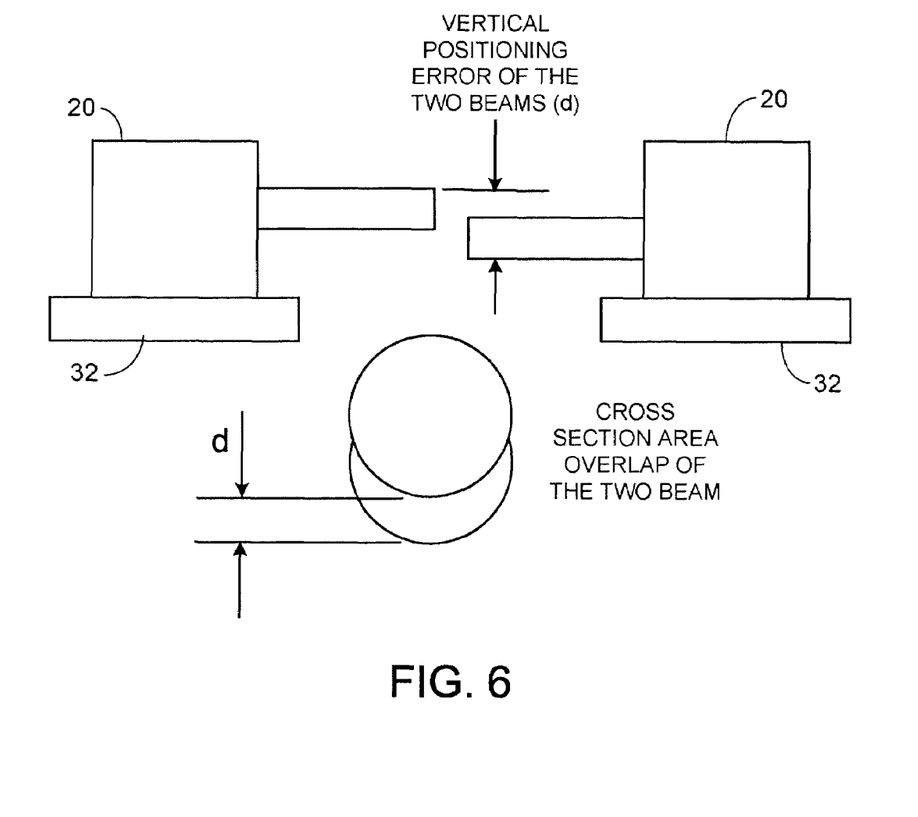
FIG. 6 presents diagrammatical side and sectional views illustrating a matching feature between two components of the assembly.

Since in this invention connectivity of the optical blocks in free space is achieved by collimated beams, a larger (X,Y) placement error can be tolerated compared to other techniques. This can easily be visualized by overlapping the cross-sections of two collimated beams in free space from two optical BLOCKS. FIG. 6 shows this concept.

As it is observed, the "coupling efficiency" between two blocks, which is a measure to quantify how well two blocks "match" each other, is 100% if two beams perfectly overlap. But, if there is a positioning error, due to alignment or attachment errors, then overlap between two collimated beams will be incomplete and coupling efficiency will drop.

For a given error in position of the collimated beam, the amount of drop in coupling efficiency depends upon the size of the cross-section area of the collimated beam (or diameter D) in free space. A larger beam diameter will be less sensitive to alignment error than a smaller beam diameter for a given positioning error. For example, a 25 micrometer error in position and a 1000 micrometer beam diameter will introduce only few percent of reduction in coupling efficiency. However, a similar 25 micrometer error will cause significant reduction in coupling efficiency for a beam with 300 micrometer diameter. This implies that as long as the free space collimated beam diameter (D) is large enough, one can align and attach elements of the optical building BLOCKS with small error (d). For instance, in this example, 25 micrometers error for a 1 mm beam diameter is acceptable and is twice an order of magnitude more relaxed than other techniques. Currently, in commonly practiced assembly techniques in the opto-electronic industry, as it was stated earlier, minimum required accuracy is micrometer to sub-micrometer, which is one or two orders of magnitude more critical than what is required in this invention. This opens the door for many available inexpensive attachment and alignment techniques which have not been suitable, and thus have been neglected, until now.

Another source of reduction in coupling efficiency between two blocks is the relative angle of the two connecting beams between two adjacent optical BLOCKS. In an ideal case, these two beams are parallel in lateral and vertical directions. Angular error in the lateral direction can be corrected during aligning and "matching" of two optical blocks relative to each other. However, vertical angular error must be minimized during construction of individual optical BLOCKS.

Figure 7:
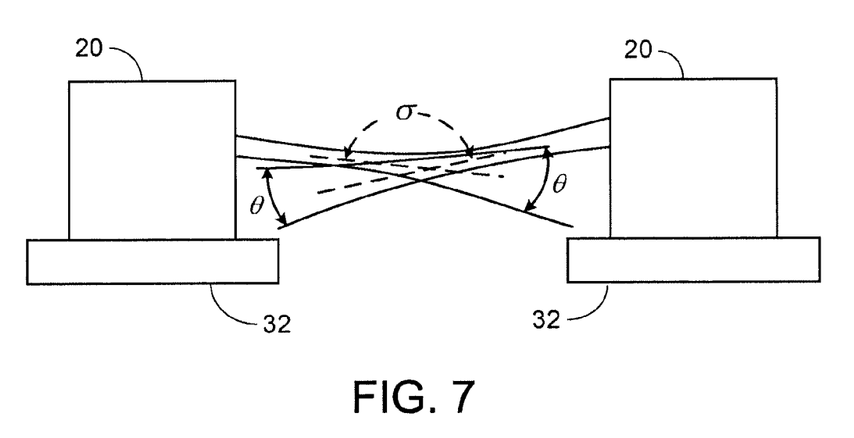
FIG. 7 is a diagrammatical side view illustrative of a matching feature between two components of the assembly.

Using a similar approach, one can show that the drop in coupling efficiency is proportional to the ratio of the angular error to collimated beam divergence angle (δ/Θ). FIG. 7 illustrates this approach. Here δ represents angular error and Θ is the beam divergence. Since for a Gaussian beam the divergence angle is inversely proportional to the beam diameter, minimizing the effect of angular error requires a beam with smaller diameter. In contrast, for minimizing the effect of the lateral or vertical positioning error, a larger beam diameter is desired. Thus, selection of an optimal value for beam diameter will satisfy both requirements. This can be done by considering practical limitations in achieving angular and positional tolerances in aligning and attaching optical elements. One can define a merit function as (M), defined hereinbelow, and then, by considering a practical limit for angular error, one can estimate an optimal beam diameter for free space connectivity.

$$M = (d/D)^2 + (\delta/\Theta)^2$$

In this relation, d is the maximum lateral or vertical error in the placement of a collimated beam of an optical BLOCK, D is the beam diameter, δ is the angular error of the collimated beam and Θ is the collimated beam divergence angle.

FIG. 6 illustrates the effect of lateral or vertical errors in positioning of the beam from two adjacent optical blocks. Coupling efficiency is proportional to the overlap area and can be increased by increasing the diameter of the beam for a given positioning error (d).

FIG. 7 illustrates the effect of angular error and its relation with beam divergence angle positioning error (d).

According to this invention, complex optical systems can be readily populated, configured, and manufactured on demand in a form somewhat analogous to hybrid electronic and printed circuit boards for the electronics industry. In an efficient assembly line, any building block of the final product should have two major characteristics: (1) each block should be as simple and as generic as possible; and (2) manufacturing yield for constructing each building block must be as high as possible. In addition, the final assembling process must be as simple as possible. In this invention, all three of these characteristics co-exist. Once all building blocks are prepared and collected in an inventory bank, one can use conventional automated packaging tools, such as pick-place and die-attach equipment, to construct and build complex optical platforms with different configurations and functionality without requiring new development efforts.

There is thus provided a unique assembly of optical components and a method of assembling the components, which assembly and method is amendable to mass-production techniques and is flexible and applicable to a host of varying end products.

It should be understood that many additional changes in the details, materials, steps and arrangements of parts, which have been herein described and illustrated in order to explain the nature of the invention, may be made by those skilled in the art within the principles and scope of the invention as expressed in the appended claims.

What is claimed is:

1. A system for assembling optical components relative to one another, the system comprising:
    a plurality of carrier components, each one of the carrier components having a base portion, a top surface and a bottom surface of the base portion in opposition to one another, the base portion defining a given geometric shape, and at least one of the optical components disposed on the top surface of the base portion;
    an optical platform having an upper surface and a lower surface in opposition to one another, the upper surface of the optical platform having alignment patterns extending upwardly therefrom, and the alignment patterns defining a plurality of regions therebetween on the optical platform, wherein one of the regions is configured to secure the given geometric shape of the base portion of one of the carrier components thereto; and
    alignment means for aligning an optical transmission between the optical components mounted on separate ones of the carrier components.

2. A system according to claim 1 wherein the plurality of carrier components comprise a first given set of interchangeable blocks, wherein a first given set of the interchangeable blocks comprise the optical components of a fiber assembly and a collimating lens.

3. A system according to claim 2 wherein the plurality of carrier components comprise a second given set of interchangeable blocks, the second given set of interchangeable blocks comprise the optical components of an isolator, a photo-detector, and a splitter.

4. A system according to claim 3 wherein the plurality of carrier components comprise a third given set of interchangeable blocks, the third given set of interchangeable blocks comprise a laser on a sub-mount and a collimating lens.

5. A system according to claim 1 wherein each one of the plurality of carrier components comprises at least one optical terminal, wherein the at least one optical terminal of each one of the plurality of carrier components is configured to transmit a collimated beam having a given diameter and a collinear lateral and vertical positioning between two of the plurality of regions.

6. A system according to claim 1 wherein the optical platform and the carrier components are assembled together using a pick-place automated tool.

7. A system according to claim 1 wherein the carrier components are attached to the optical platform using die-attach equipment.

8. A system according to claim 1 wherein the plurality of carrier components comprise at least one electrical terminal, the at least one electrical terminal is configured for electrical communication with corresponding electrical terminals configured within the plurality of regions on the optical platform.

9. A method of assembling optical components relative to one another, the method comprising:
    selecting at least two carrier components from a group of carrier components, each one of the carrier components having at least one optical component mounted thereon;
    selecting a given number of regions from a plurality of the regions formed by alignment patterns on an optical platform, the given number of regions being equal in number to the at least two carrier components selected from the group of carrier components; and
    positioning each one of the at least two carrier components within the selected regions formed by the alignment patterns on the optical platform.

10. An assembly of optical components, the assembly comprising:
    a platform for receiving and supporting a plurality of carrier components having optical components mounted thereon;
    carrier component receiving stations formed on the platform, each of the stations being adapted to receive and retain one of the carrier components;
    a first one of the carrier components having a light beam outlet; and
    a second one of the carrier components having a light beam receiving port;
    wherein the optical component receiving stations are disposed to position the first one of the components and second one of the components relative to one another such that the light beam outlet and the light beam receiving port are in alignment with one another.

11. An assembly according to claim 10 wherein said first one of the carrier components comprises a selected one of a laser diode and a light emitting diode in combination with a collimating lens.

12. An assembly according to claim 11 wherein the second one of the components comprises a collimating lens and a fiber optic assembly.

13. An assembly according to claim 12 further comprising a third carrier component for disposition between the first one of the carrier components and the second one of the carrier components, the third carrier component having an inlet adapted to receive a light beam from the light beam outlet of the first carrier component and an outlet adapted to direct at least a portion of the light beam toward the second carrier component, and at least one optical element between the third carrier component inlet and the third carrier component outlet for altering the light beam.

14. An assembly according to claim 13 wherein the third carrier component includes an isolator.

15. An assembly according to claim 13 wherein the third carrier component includes at least one selected from a group consisting of a beam splitter and a beam reflector.

16. An assembly according to claim 13 wherein the third carrier component includes a photodiode.

17. An assembly according to claim 13 wherein the platform comprises a third station for receiving and supporting the third carrier component in a position for receiving the light beam from the first carrier component and for directing at least a portion of the light beam toward the inlet of the second carrier component.

18. An assembly according to claim 17 wherein the platform is provided with electrical conduits having terminals at at least one of the stations to power electro-optical elements disposed on the carrier component in the at least one of the stations.

19. An assembly according to claim 17 wherein all light beams between optical components are parallel to a given surface of the platform.

20. An assembly according to claim 17 wherein the platform comprises additional stations, each of the additional stations adapted to receive a carrier component selected from a multiplicity of optical components, and each of the carrier components adapted to provide a selected function relative to the emitted light beam.

21. A method for assembling optical components into an assembly for providing an emitted beam of light and for manipulating the beam of light to provide a desired result, the method comprising the steps of:

providing an optical component mounted to a carrier component for emitting a light beam;

providing further optical components mounted to a further carrier component, the optical components adapted for manipulating the emitted beam to obtain a desired optical output;

providing a platform having stations adapted to receive the carrier components having the optical components and retain the carrier components having the optical components in position for interaction with each other so as to effect the desired optical output;

providing a repository of diverse optical components mounted to carrier components, each adapted to perform an operation on the emitting beam of light; and fixing the carrier component having the light emitting optical component, and the further carrier components having the optical components selected from the repository of optical components, to the platform;

whereby to form an assembly of optical components configured to manipulate the emitted beam to accomplish the desired result.

* * * * *